(12) United States Patent
Cao et al.

(10) Patent No.: US 9,283,986 B2
(45) Date of Patent: Mar. 15, 2016

(54) FOLLOW-UP STEERING CONTROL SYSTEM FOR MULTI-AXLE AUTOMOBILE CRANE, AND MULTI-AXLE AUTOMOBILE CRANE

(71) Applicant: Xuzhou Heavy Machinery Co., Ltd., Xuzhou (CN)

(72) Inventors: Peilei Cao, Xuzhou (CN); Zhifang Wang, Xuzhou (CN); Guangguang Cao, Xuzhou (CN); Honggang Ding, Xuzhou (CN); Yongliang Zhang, Xuzhou (CN); Jiandong Wang, Xuzhou (CN)

(73) Assignee: Xuzhou Heavy Machinery Co., Ltd., Xuzhou (CN)

( * ) Notice: Subject to any disclaimer, the term of this patent is extended or adjusted under 35 U.S.C. 154(b) by 0 days.

(21) Appl. No.: 14/706,765

(22) Filed: May 7, 2015

(65) Prior Publication Data
US 2015/0239498 A1    Aug. 27, 2015

Related U.S. Application Data

(63) Continuation of application No. PCT/CN2013/075473, filed on May 10, 2013.

(30) Foreign Application Priority Data

Nov. 27, 2012    (CN) .......................... 2012 1 0489209

(51) Int. Cl.
*B62D 5/20*    (2006.01)
*B62D 7/14*    (2006.01)
*B66C 23/36*    (2006.01)
(Continued)

(52) U.S. Cl.
CPC    *B62D 5/20* (2013.01); *B62D 5/062* (2013.01);
*B62D 5/065* (2013.01); *B62D 5/12* (2013.01);
*B62D 7/144* (2013.01); *B66C 23/36* (2013.01)

(58) Field of Classification Search
CPC combination set(s) only.
See application file for complete search history.

(56) References Cited

U.S. PATENT DOCUMENTS 5,449,186 A    9/1995    Gerl et al.
7,770,906 B2 *    8/2010    Koenigstein ........... B62D 7/144
                                                        180/209
(Continued)

FOREIGN PATENT DOCUMENTS

CN    102019958 A    4/2011
CN    102030035 A    4/2011
(Continued)

OTHER PUBLICATIONS

International Search Report mailed Sep. 5, 2013 in PCT/CN2013/075473, 4 pages.

*Primary Examiner* — Nicole Verley
(74) *Attorney, Agent, or Firm* — Kilpatrick Townsend & Stockton LLP (57) ABSTRACT

Disclosed are a follow-up steering control system for a multi-axle automobile crane and the multi-axle automobile crane. In a steering state of the multi-axle automobile crane, an output oil pressure of a first oil pressure output port is greater or less than that of a second oil pressure output port; a piston rod of a left-turning hydraulic cylinder is lengthened and a piston rod of a right-turning hydraulic cylinder is shortened, or the piston rod of the left-turning hydraulic cylinder is shortened and the piston rod of the right-turning hydraulic cylinder is lengthened; and a first knuckle arm and a second knuckle arm are driven to make a rear left steering wheel and a rear right steering wheel turn left or right.

10 Claims, 5 Drawing Sheets

(51) Int. Cl.
　　　*B62D 5/06*　　　(2006.01)
　　　*B62D 5/065*　　　(2006.01)
　　　*B62D 5/12*　　　(2006.01)

(56) References Cited

U.S. PATENT DOCUMENTS 8,128,107 B2 * 3/2012 Koenigstein ............ B60G 9/02
　　　　　　　　　　　　　　　　　　　　180/209
2015/0298729 A1 * 10/2015 Blond .................... B62D 5/04
　　　　　　　　　　　　　　　　　　　　180/421

FOREIGN PATENT DOCUMENTS

| | | | |
|---|---|---|---|
| CN | 102030037 A | 4/2011 | |
| CN | 102050143 A | 5/2011 | |
| CN | 201907559 U | 7/2011 | |
| CN | 201941836 U | 8/2011 | |
| CN | 201941837 U | 8/2011 | |
| CN | 102455177 A | 5/2012 | |
| CN | 202368639 U | 8/2012 | |
| CN | 102673639 U | 9/2012 | |
| CN | 102689651 A | 9/2012 | |
| CN | 202574357 U | 12/2012 | |
| CN | 202669912 U | 1/2013 | |
| CN | 102923187 A | 2/2013 | |
| CN | 202923705 U | 5/2013 | |
| IT | EP 0845403 A2 * | 6/1998 | ............ B62D 7/144 |
| JP | H1134887 A | 2/1999 | |

* cited by examiner

FOLLOW-UP STEERING CONTROL SYSTEM FOR MULTI-AXLE AUTOMOBILE CRANE, AND MULTI-AXLE AUTOMOBILE CRANE

CROSS-REFERENCES TO RELATED APPLICATIONS

This application is a continuation application of PCT application PCT/CN2013/075473 entitled "FOLLOW-UP STEERING CONTROL SYSTEM OF MULTI-AXLE AUTOMOBILE CRANE AND MULTI-AXLE AUTOMOBILE CRANE," filed on May 10, 2013, which claims priority to Chinese Patent Application No. 201210489209.X, filed on Nov. 27, 2012, which are herein incorporated by reference in their entirety for all purposes.

FIELD OF THE INVENTION

The present invention relates to the technical field of automobile steering control, in particular to a follow-up steering control system for a multi-axle automobile crane, and the multi-axle automobile crane.

BACKGROUND OF THE INVENTION

In recent years, with more and more needs of construction and maintenance for new energy projects such as large wind power equipment as well as construction for large petrochemical plant and power plant, the market for the automobile crane is quickly developed. In order to meet the requirements on the maneuverability and cornering behaviour of automobiles during short-distance site transfer or low-speed steering, the presently-produced automobile cranes with telescopic suspension arms or trussed suspension arms are generally provided with three or even more axles, and at least one rear axle of most of the automobile cranes is capable of active steering or follow-up steering.

Figure 1:
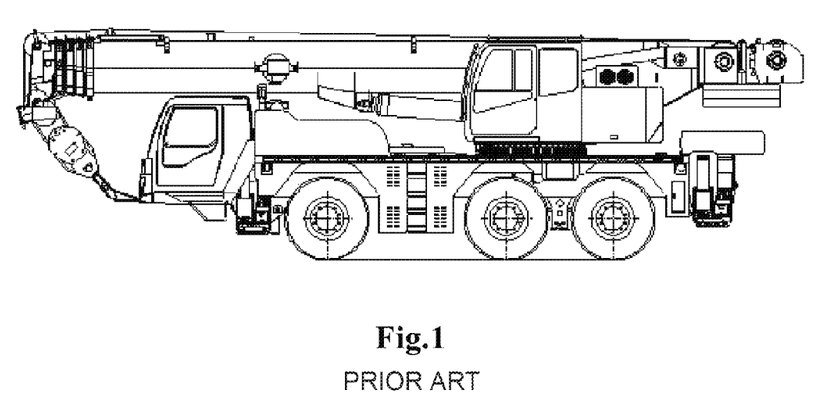
FIG. 1 is a schematic diagram of an all-terrain crane with hydro-pneumatic suspension in the prior art.
Figure 2:
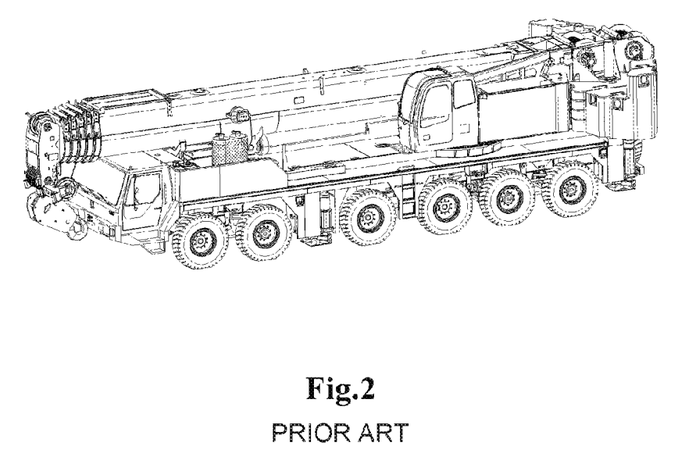
FIG. 2 is a schematic diagram of an automobile crane with a plate spring suspension in the prior art.

For illustrative purposes, schematic diagrams of a three-axle all-terrain crane and a six-axle automobile crane are given. FIG. 1 is an all-terrain crane equipped with a hydro-pneumatic suspension, and FIG. 2 is an automobile crane equipped with a plate spring suspension. Either the all-terrain crane or the automobile crane may travel on construction sites and on public roads. Therefore, on the premise of satisfying the maneuverability of the automobile, all active steering rear axles must be controllable so as to prevent failures caused by a separated rear axle steering system.

Figure 3:
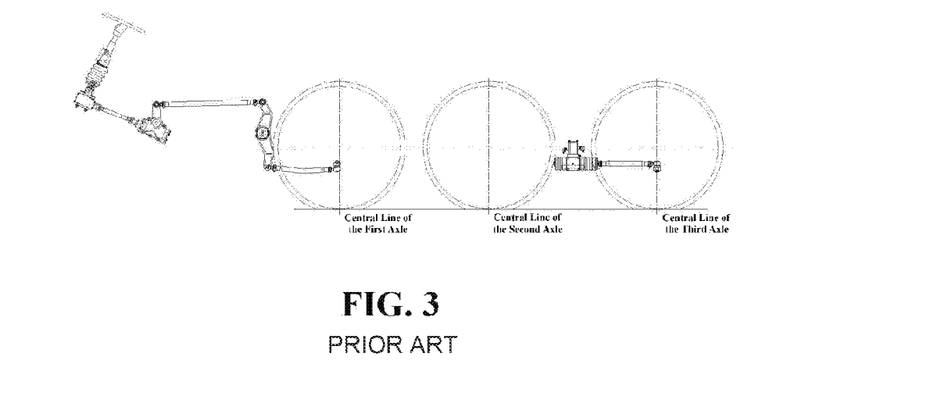
FIG. 3 is a schematic diagram of a steering system for the all-terrain crane in FIG. 1.
Figure 4:
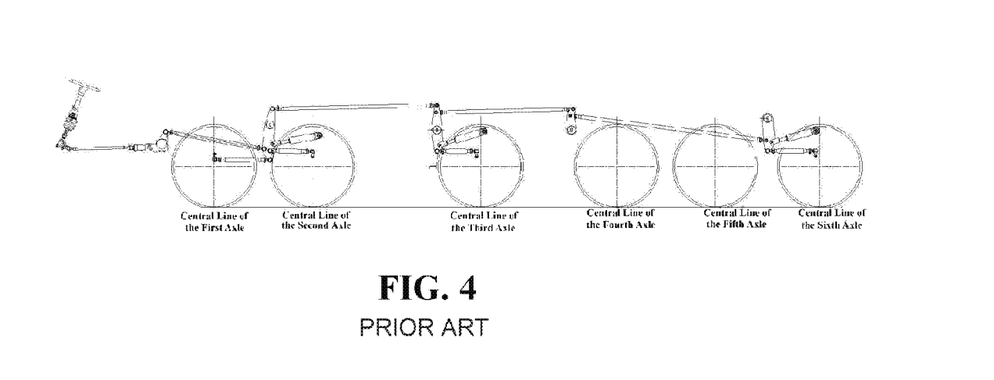
FIG. 4 is a schematic diagram of a steering system for the automobile crane in FIG. 2.

With respect to an automobile crane similar to the ones shown in FIG. 1 and FIG. 2, rear axle steering may be realized by a mechanical steering linkage system or an electronic hydraulic steering device. For example, FIG. 3 is an example of a steering system for the all-terrain crane shown in FIG. 1, and FIG. 4 is an example of a steering system for the automobile crane shown in FIG. 2. In FIG. 3, the mechanical linkage connection to the front axle is cancelled. In FIG. 4, force transfer and steering transfer are transferred to the sixth axle from the first axle by a plurality of four-link mechanisms so as to obtain six-axles steering.

When the all-terrain crane shown in FIG. 1 adopts the steering system shown in FIG. 3 and normally travels on a road, the rear axle is kept at the middle position by a steering locking device mounted on the real axle, thus ensuring the straight travelling of the rear axle. The steering of the rear axle is only activated in a short time during transfer on a small site. That is to say, according to the steering technology shown in FIG. 3, the rear axle is incapable of active steering.

When the automobile crane shown in FIG. 2 adopts the steering system shown in FIG. 4, the rear axle is constrained by steering levers and only capable of reversely steering by following the front axle. The steering system shown in FIG. 4 has the defects that: too many steering four-link mechanisms are provided; transfer of the force and steering movement has to be determined according to the specific stiffness of the steering system, and the higher the stiffness of the steering system is, the faster the transfer speed of the force is, and the faster the rear axle steering is; after being used for a period of time, ball at both ends of a steering linkage assembly are worn, gaps are increased, the steering lag of the rear axle is increased, and abnormal wear of tires also occurs to a certain extent.

Some rear axle electronically-controlled steering systems and methods for an automobile crane also exist in the prior art, but are expensive and are not suitable for an automobile crane or an all-terrain crane with only one active steering rear axle, or not suitable for an automobile crane with a high travelling speed. Therefore, a novel follow-up steering control system is needed.

BRIEF SUMMARY OF THE INVENTION

For this purpose, one technical problem to be solved by the present invention is to provide a follow-up steering control system for a multi-axle automobile crane, and a hydraulic device for driving wheels to steer is arranged on an active steering rear axle.

The present invention also provides a follow-up steering control system for a multi-axle automobile crane. The multi-axle automobile crane comprises an active steering rear axle 9, a rear left steering wheel 11 and a rear right steering wheel 15 mounted on the active steering rear axle 9, a first knuckle arm 17 for controlling the steering of the rear left steering wheel 11, a second knuckle arm 18 for controlling the steering of the rear right steering wheel 15, and an oil return circuit, characterized in that the follow-up steering control system comprises a left-turning hydraulic cylinder 8, a right-turning hydraulic cylinder 13 and a first control valve device 7. A piston rod of the left-turning hydraulic cylinder 8 and the bottom end of the cylinder block of the left-turning hydraulic cylinder are hinged with the active steering rear axle 9 and the first knuckle arm 17 respectively. A piston rod of the right-turning hydraulic cylinder 13 and the bottom end of the cylinder block of the right-turning hydraulic cylinder are hinged with the active steering rear axle 9 and the second knuckle arm 18 respectively. A first oil pressure output port A of the first control valve device 7 is communicated with a rodless cavity of the left-turning hydraulic cylinder 8 and a rod cavity of the right-turning hydraulic cylinder 13. A second oil pressure output port B of the first control valve device 7 is communicated with a rod cavity of the left-turning hydraulic cylinder 8 and a rodless cavity of the right-turning hydraulic cylinder 13. In the case where the first oil pressure output port A outputs a high pressure and the second oil pressure output port B is communicated with the oil return circuit, the piston rod of the left-turning hydraulic cylinder 8 extends and the piston rod of the right-turning hydraulic cylinder 13 retracts, so that the first knuckle arm 17 and the second knuckle arm 18 are driven to turn the rear left steering wheel 11 and the rear right steering wheel 15 left. In the case where the first oil pressure output port A is communicated with the oil return circuit and the second oil pressure output port B outputs a high pressure, the piston rod of the left-turning hydraulic cylinder 8 retracts and the piston rod of the right-turning hydraulic cylinder 13 extends, so that the first knuckle arm 17 and the second knuckle arm 18 are driven to turn the rear left steering wheel 11 and the rear right steering wheel 15 right.

According to one embodiment of the system of the present invention, the system further comprises a middle-position locking hydraulic cylinder 10 and a second control valve device 12. The middle-position locking hydraulic cylinder 10 comprises a middle-position locating block 28 fixedly arranged in a cylinder block 21, and a first piston 22 and a second piston 29 arranged on both sides of the middle-position locating block 28 respectively. The first piston 22 is fixedly connected with a piston rod, the inner cavity of the cylinder block 21 is separated into a rod cavity 25, a middle cavity 24 and a rodless cavity 26 by the first piston 22 and the second piston 29, and the middle cavity 24 is formed between the first piston 22 and the second piston 29. The piston rod 23 of the middle-position locking hydraulic cylinder 10 and the bottom end of the cylinder block 21 are hinged with the active steering rear axle 9 and one of the first knuckle arm 17 and the second knuckle arm 18 respectively. The third oil pressure output port T2 of the second control valve device 12 is communicated with the middle cavity 24, and the fourth oil pressure output port D is communicated with the rodless cavity 25 and the rod cavity 26 of the middle-position locking hydraulic cylinder 10 respectively. The third oil pressure output port T2 is always communicated with the oil return circuit. In the case where the multi-axle automobile crane travels forward, the fourth oil pressure output port D outputs a high pressure and the third oil pressure output port T2 is communicated with the oil return circuit, and the first piston 22 and the second piston 29 are in contact with both ends of the middle-position locating block 28 respectively.

Moreover, according to one embodiment of the system of the present invention, in the case where the multi-axle automobile crane turns, both the third oil pressure output port T2 and the fourth oil pressure output port D are communicated with the oil return circuit. In the case where the multi-axle automobile crane travels forward, both the second oil pressure output port B and the output oil pressure of the first oil pressure output port A are communicated with the oil return circuit.

Moreover, according to one embodiment of the system of the present invention, the bottom end of the cylinder block of the left-turning hydraulic cylinder 8 is hinged with the active steering rear axle 9, and the piston rod of the left-turning hydraulic cylinder 8 is hinged with the first knuckle arm 17; and the bottom end of the cylinder block of the right-turning hydraulic cylinder 13 is hinged with the active steering rear axle 9, and the piston rod of the right-turning hydraulic cylinder 13 is connected with the second knuckle arm 18.

Moreover, according to one embodiment of the system of the present invention, the system comprises a pressure detection device 16 for detecting the oil pressure of the fourth oil pressure output port D.

Moreover, according to one embodiment of the system of the present invention, the system comprises an automobile speed detection device for measuring the travelling speed of the multi-axle automobile crane.

Moreover, according to one embodiment of the system of the present invention, the system comprises a control device for controlling respective oil pressure output ports of the first control valve device 7 and the second control valve device 12 to output a high pressure or to be communicated with the oil return circuit.

Moreover, according to one embodiment of the system of the present invention, the system comprises a front axle steering detection device for measuring the steering angle of the front axle of the multi-axle automobile crane and a rear axle steering detection device for measuring the steering angle of the active steering rear axle 9.

Moreover, according to one embodiment of the system of the present invention, in the case where the lowest speed limit value of the automobile is detected by the automobile speed detection device, the front axle detection device detects that the front axle is located at a middle position, and the rear axle detection device detects that the active steering rear axle 9 is located at the middle position, the control device controls the fourth oil pressure output port D to output a high pressure and controls the third oil pressure output port T2 to be communicated with the oil return circuit.

The present invention also provides a multi-axle automobile crane comprises the above follow-up steering control system for a multi-axle automobile crane.

According to the follow-up steering control system for the multi-axle automobile crane and the multi-axle automobile crane of the present invention, a hydraulic device for steering the wheels is arranged on the active steering rear axle, so that steering is flexible, the low-speed steering maneuverability and cornering behaviour are improved, and the drifting which may occur during high-speed travelling is prevented.

BRIEF DESCRIPTION OF THE DRAWINGS

The accompanying drawings described herein are used for providing further understanding for the present invention and form a part of the present application, and the schematic embodiments of the present invention and the descriptions thereof are used for explaining the present invention, and do not form improper limits on the present invention. In the accompanying drawings.

DETAILED DESCRIPTION OF THE INVENTION

The present invention provides a follow-up steering control system for a multi-axle automobile crane to solve the problem of the maneuverability, cornering behaviour as well as the controllability and stability required for the automobile crane with an active steering rear axle.

The present invention is further described below in details with reference to the accompanying drawings and embodiments.

Figure 5:
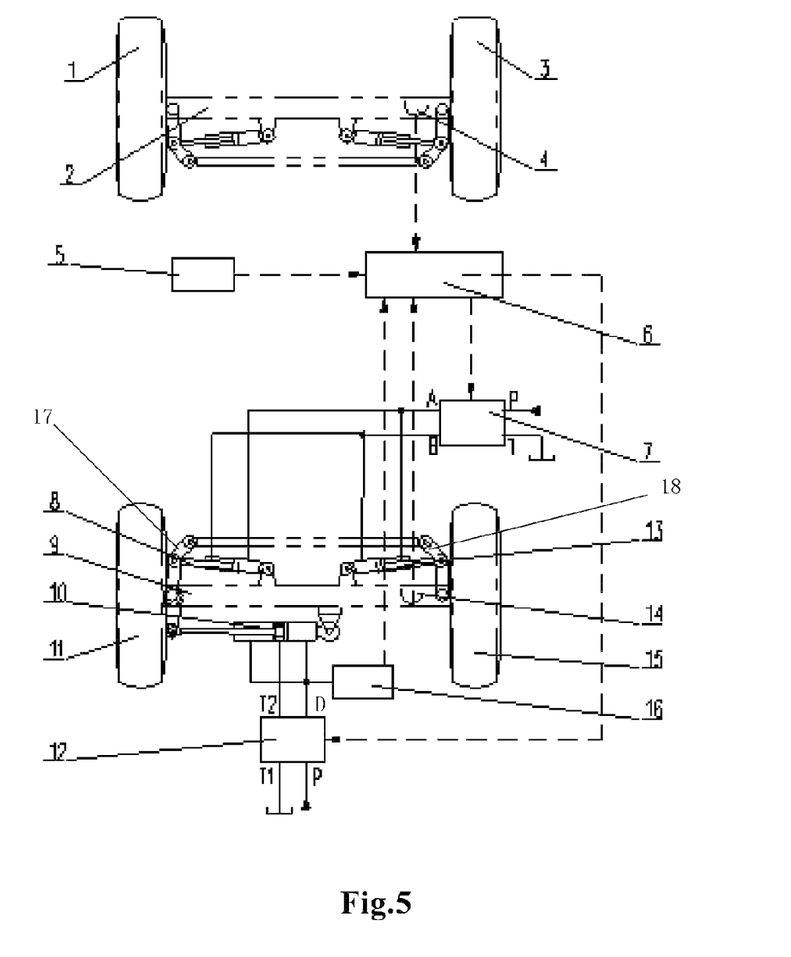
FIG. 5 is a schematic diagram of an embodiment of a follow-up steering control system for a multi-axle automobile crane according to the present invention.

FIG. 5 is a schematic diagram of one embodiment of the follow-up steering control system for a multi-axle automobile crane according to the present invention. As shown in FIG. 5, the multi-axle automobile crane comprises: an active steering rear axle 9; a rear left steering wheel 11 and a rear right steering wheel 15 mounted on the active steering rear axle 9; a first knuckle arm 17 for controlling the steering of the rear left steering wheel 11; and a second knuckle arm 18 for controlling the steering of the rear right steering wheel 15.

The follow-up steering control system for the multi-axle automobile crane comprises a left-turning hydraulic cylinder 8, a right-turning hydraulic cylinder 13 and a first control valve device 7. Both ends of the left-turning hydraulic cylinder 8 are hinged with the active steering rear axle 9 and the first knuckle arm 17 respectively. Both ends of the right-turning hydraulic cylinder 13 are hinged with the active steering rear axle 9 and the second knuckle arm 18 respectively. According to one embodiment of the present invention, other connection manners may also be used, for example, both ends of the left-turning hydraulic cylinder 8 are connected to the active steering rear axle 9 and the first knuckle arm 17 respectively by means of welding, threaded connection and the like.

A first oil pressure output port A of the first control valve device 7 is communicated with the rodless cavity of the left-turning hydraulic cylinder 8 and the rod cavity of the right-turning hydraulic cylinder 13 respectively. A second oil pressure output port B of the first control valve device 7 is communicated with the rod cavity of the left-turning hydraulic cylinder 8 and the rodless cavity of the right-turning hydraulic cylinder 13 respectively.

The rod cavity in the present invention is an oil cavity in the hydraulic cylinder where a piston rod is located, and the rodless cavity is an oil cavity in the hydraulic cylinder without a piston rod.

In a steering state of the multi-axle automobile crane, the output oil pressure of the first oil pressure output port is greater or less than that of the second oil pressure output port, the piston rod of the left-turning hydraulic cylinder 8 extends and the piston rod of the right-turning hydraulic cylinder 13 retracts, or the piston rod of the left-turning hydraulic cylinder 8 retracts and the piston rod of the right-turning hydraulic cylinder 13 extends, and the first knuckle arm 17 and the second knuckle arm 18 are driven to turn the rear left steering wheel 11 and the rear right steering wheel 15 left or right.

The multi-axle automobile crane is provided with a rear axle capable of actively steering and a steering wheel mounted on the rear axle, so that steering is flexible. According to one embodiment of the present invention, the multi-axle automobile crane may be provided with a plurality of active steering rear axles, and each of the plurality of active steering rear axles has the active steering capability.

Figure 6:
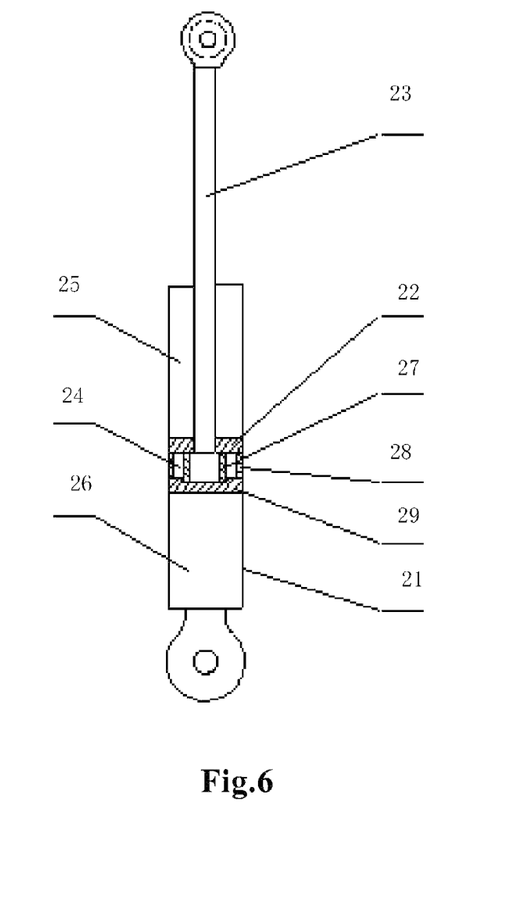
FIG. 6 is a schematic diagram of a middle-position locking hydraulic cylinder in an embodiment of the follow-up steering control system for the multi-axle automobile crane according to the present invention.

FIG. 6 is a schematic diagram of a middle-position locking hydraulic cylinder in an embodiment of the follow-up steering control system for the multi-axle automobile crane according to the present invention.

As shown in FIG. 6, the middle-position locking hydraulic cylinder 10 is a double-piston hydraulic cylinder and comprises a middle-position locating block 28, a first piston 22 and a second piston 29 arranged in the cylinder block 25. The first piston 22 and the second piston 29 are arranged at two opposite sides of the middle-position locating block 28 respectively. A middle cavity is formed between the first piston 22 and the second piston 27 and is communicated with the oil return system of the follow-up steering control system.

The inner cavity of the cylinder block 21 is divided into three portions, that is, a rod cavity 25, a middle cavity 24 and a rodless cavity 26, by the first piston 22 and the second piston 29. The piston rod 23 is in the shape of a stepped axle. A large-diameter portion of the piston rod 23 is arranged within the middle cavity, and a small-diameter portion of the piston rod 23 protrudes by sequentially passing through the first piston 22 and the upper end cover of the cylinder block. A tubular middle-position locating block 28 is fixedly arranged on the inner wall of the middle cavity.

According to one embodiment of the present invention, a middle piston 27 is mounted around the outer circumferential surface of the large-diameter portion of the piston rod 23. The length of the middle piston 27 is greater than or equal to that of the middle-position locating block 28. The lower end surface of the middle piston 27 abuts against the upper end surface of the middle portion of the second piston 29. A groove is formed in the upper end surface of the middle portion of the second piston 29. The lower end surface of the middle piston 27 is in contact with the groove, and the peripheral portion of the upper end surface of the second piston 29 abuts against the left end surface of the middle-position locating block 28.

The middle cavity 24 is always connected with system backflow. The rod cavity 25 and the rodless cavity 26 are communicated with the pressure oil circuit or the oil return circuit of the system simultaneously through the corresponding oil inlet solenoid switch valve and oil return solenoid switch valve. When both the rod cavity 25 and the rodless cavity 26 are communicated with the oil return circuit of the system and the middle-position locking cylinder is in an unlocked state, an external force applied on the piston rod 23 pushes the piston rod 23 to extend or retract.

When the rod cavity 25 and the rodless cavity 26 of the middle-position locking cylinder are communicated with the pressure oil circuit of the system and the middle cavity 24 is communicated with the oil return circuit of the system and the middle-position locking cylinder is in a locked state, the first piston 22 is moved to the left by the pressure oil until the first piston 22 abuts against the middle-position locating block 28, and the second piston 29 is moved to the right by the pressure oil and is brought into contact with at least one of the middle piston 27 and the middle-position locating block 28, so as to ensure that the wheel on the corresponding steering axle to keep straight running.

The specific position of the middle-position locking cylinder in the locked state may be adjusted by adjusting the position of the middle-position locating block 28 and by adjusting the length of the middle piston 27. Moreover, the middle piston 27 and the middle-position locating block 28 provide dual positioning protection.

According to one embodiment of the present invention, the follow-up steering control system comprises a middle-position locking hydraulic cylinder 10 and a second control valve device 12. The terminal ends of the piston rod 23 and the cylinder block 21 of the middle-position locking hydraulic cylinder 10 are hinged with the active steering rear axle 9 and the first knuckle arm 17 (or the second knuckle arm 18) respectively. A third oil pressure output port T2 of the second control valve device 12 is communicated with the middle cavity 24, and a fourth oil pressure output port D of the second control valve device 12 is communicated with both the rodless cavity 25 and the rod cavity 26 of the middle-position locking hydraulic cylinder 10. The third oil pressure output port T2 is always communicated with the oil return circuit. In the case where multi-axle automobile crane runs forward, the fourth oil pressure output port D outputs a high pressure and the third oil pressure output port T2 is communicated with the oil return circuit, and the first piston 22 and the second piston 29 are in contact with both ends of the middle-position locating block 28 respectively.

In the case where the multi-axle automobile crane turns, the output oil pressures of the third oil pressure output port T2 and the fourth oil pressure output port D are the same, and both the third oil pressure output port T2 and the fourth oil pressure output port D are communicated with the oil return system of the follow-up steering control system. In the case where the multi-axle automobile crane runs forward, the output oil pressures of the first oil pressure output port A and the second oil pressure output port B are the same, both the first oil pressure output port A and the second oil pressure output port B are communicated with the oil return system of the follow-up steering control system, and the output oil pressures of the third oil pressure output port T2 and the fourth oil pressure output port D are equal to a preset threshold value.

According to one embodiment of the present invention, two steering cylinders and one steering middle-position locking cylinder are arranged at the rear axle 9. When the rear axle turns actively, a high-pressure oil source enters into the steering cylinder of the rear axle through the port A or the port B from the port P of the first control valve device 7, so as to achieve the left steering or right steering of the rear axle. The port P of the second control valve device 12 is shut off, and oils from the three oil ports T1, T2 and D are communicated with one another and are also communicated with the oil return system of the hydraulic steering system.

When the rear axle keeps straight running, the port P of the first control valve device 7 is shut off, oils of the three oil ports A, B and T are communicated with one another, and are communicated with the oil return system of the hydraulic steering system. Pressure oil output by an oil pump flows to the port D through the port P of the second control valve device 12, and the steering middle-position locking cylinder of the rear axle is forced to return to the middle position. When the pressure of the port A detected by a pressure detection device 16 is about a set limit value, the port P is shut off, the high-pressure oil of the port D is shut off by the second control valve device 12; in addition, the port T1 is communicated with the port T2.

According to one embodiment of the present invention, the cylinder block end of the left-turning hydraulic cylinder 8 is hinged with the active steering rear axle 9, and the cylinder rod end of the left-turning hydraulic cylinder 8 is hinged with the first knuckle arm 17; the cylinder block end of the right-turning hydraulic cylinder 13 is hinged with the active steering rear axle 9, and the cylinder rod end of the right-turning hydraulic cylinder 13 is hinged with the second knuckle arm 18.

According to one embodiment of the present invention, the highest running speed of the automobile in the driving condition with which the rear axle is able to return to the middle position is set to a range between 25 km/h and 50 km/h. When the highest speed limit of the automobile is detected by the speed detection device 5 and the control device 6 sends a power-on signal or a power-off signal to the solenoid switch valves of the first control valve device 7 and the second control valve device 12, the rear axle returns to the middle position. At this time, the active hydraulic steering system of the rear axle ensures that the rear axle is located at the middle position during travelling, and a stable straight and high speed travelling of the automobile may be ensured, and thus the controllability and stability may be ensured.

According to one embodiment of the present invention, the lowest running speed of the automobile in a driving condition with which the rear axle is able to steer actively. The control device 6 may send a power-on signal or a power-off signal to the solenoid switch valves of the first control valve device 7 and the second control valve device 12 and the rear axle may steer actively only when the following three conditions are satisfied.

The specific contents of the three conditions are: the lowest speed limit value of the automobile is detected by the speed detection device 5; the front axle is detected to be located at the middle position by a front axle detection device 4; and the rear axle is detected to be located at the middle position by a rear axle detection device 14.

The front axle detection device 4 and the rear axle detection device 14 may be angle detection devices, or may also be middle-position detection devices. These two detection devices together determine whether the steering axles are located at the middle positions. As long as one of the detection devices detects that the steering axle is not located at the middle position, regardless of how low the speed of the automobile is, the rear axle is always locked at the middle position by the steering controller, and the automobile is kept in a straight running state by the steering controller.

According to one embodiment of the present invention, a multi-axle automobile crane, which may also be a multi-axle automobile, comprises the above mentioned follow-up steering control system of the multi-axle automobile crane.

Figure 7:
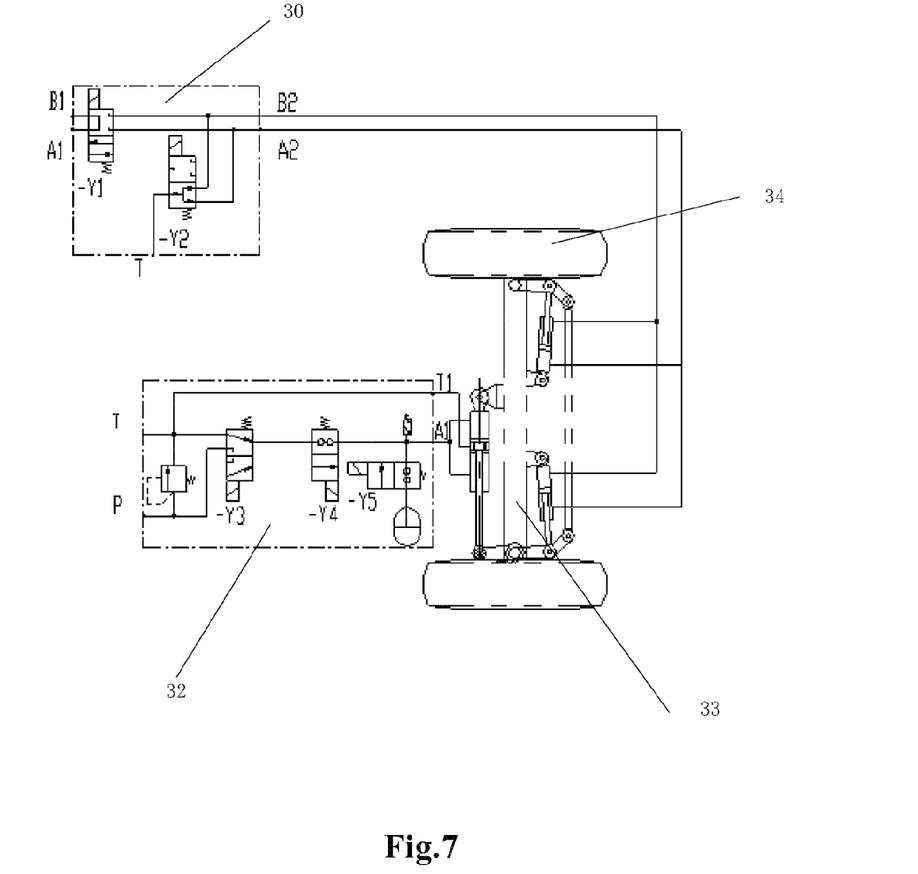
FIG. 7 is a schematic diagram of a control valve device in an embodiment of the follow-up steering control system for the multi-axle automobile crane according to the present invention.

FIG. 7 is a schematic diagram of a control valve device in an embodiment of a follow-up steering control system for a multi-axle automobile crane according to the present invention.

As shown in FIG. 7, a first control valve device 30 comprises a first solenoid valve –Y1 and a second solenoid valve –Y2, and a second control valve device 31 comprises a third solenoid valve –Y3, a fourth solenoid valve –Y4 and a fifth solenoid valve –Y5. Moreover, as shown in the above mentioned embodiments, a first oil pressure output port A2 of the first control valve device is communicated with the rodless cavity of the left-turning hydraulic cylinder and the rod cavity of the right-turning hydraulic cylinder; a second oil pressure output port B2 of the first control valve device is communicated with the rod cavity of the left-turning hydraulic cylinder and the rodless cavity of the right-turning hydraulic cylinder; a third oil pressure output port T1 of the second control valve device is communicated with the middle cavity of the middle-position locking hydraulic cylinder, and a fourth oil pressure output port A1 is communicated with the rodless cavity and the rod cavity of the middle-position locking hydraulic cylinder; wherein the third oil pressure output port T1 is always communicated with an oil return circuit.

When the rear axle 33 steers actively, the power-on/off conditions of respective solenoid valve are as follows: the first solenoid valve –Y1 is powered on, the second solenoid valve –Y2 is powered on, the third solenoid valve –Y3 is powered off, the fourth solenoid valve –Y4 is powered on, and the fifth solenoid valve Y5 is powered off. At this time, the rod cavity, the middle cavity and the rodless cavity of the steering middle-position locking cylinder are all communicated with a hydraulic oil return tank of the system.

When the high-pressure oil output by the oil pump enters into the oil port A1 of a control valve bank I and the system oil return is communicated with the oil port B1 of the control valve bank I, the oil port A2 outputs high-pressure oil, the oil port B2 returns to the oil tank, and the rear axle 33 may turn left.

When the high-pressure oil output by the oil pump enters into the oil port B1 of the control valve bank I and the system oil return is communicated with the oil port A1 of the control valve bank I, the oil port B2 outputs high-pressure oil, the oil port A2 returns to the oil tank, and the rear axle may turn right.

When the rear axle returns to the middle position and does not participate in the steering process any more, the power-on/off conditions of respective solenoid valves are as follows: the first solenoid valve –Y1 is powered off, the second solenoid valve –Y2 is powered off, the third solenoid valve –Y3 is powered on, and the fourth solenoid valve Y4 is powered on. Oil output by the oil pump enters into the rod cavity and the rodless cavity of the steering middle-position locking cylinder through the port P of a control valve bank II, the third solenoid valve –Y3 and the fourth solenoid valve –Y4, and the rear axle is returned to the middle position by virtue of a stop device within the steering middle-position locking cylinder.

When a pressure acting on the rod cavity and the rodless cavity of the steering middle-position locking cylinder reaches a certain value, the fifth solenoid valve –Y5 is powered on, the fourth solenoid valve –Y4 is powered off, the third solenoid valve –Y3 is also powered off, and an accumulator 32 is used for compensating the pressure loss caused by the interior leakage of the steering middle-position locking cylinder, that is, the pressure acting on the rod cavity and the rodless cavity of the steering middle-position locking cylinder is high-pressure oil.

The follow-up steering control system of the multi-axle automobile crane of the present invention provides a hydraulic control method for follow-up steering for an automobile with an active steering rear axle, improves the steering maneuverability and cornering behaviour of the crane at the low speed, and prevents the drifting which may occur during high-speed travelling.

Finally, it should be noted that: the above embodiments are only for describing the technical solutions of the present invention, rather than limiting the present invention; although the present invention is described in details with reference to the preferred embodiments, those of ordinary skill in the art should understand that: the specific implementations of the present invention can still be modified or a part of the technical features can be equivalently substituted, without departing from the spirit of the technical solutions of the present invention, these modified technical solutions shall be within the scope of the technical solutions claimed by the present invention.

What is claimed is:

1. A follow-up steering control system for a multi-axle automobile crane, the multi-axle automobile crane comprising an active steering rear axle (9), a rear left steering wheel (11) and a rear right steering wheel (15) mounted on the active steering rear axle (9), a first knuckle arm (17) for controlling the steering of the rear left steering wheel (11), a second knuckle arm (18) for controlling the steering of the rear right steering wheel (15), and an oil return circuit, the follow-up steering control system comprising:

a left-turning hydraulic cylinder (8), a right-turning hydraulic cylinder (13), a first control valve device (7), a middle-position locking hydraulic cylinder (10), a second control valve device (12), a front axle steering detection device, a rear axle steering detection device, an automobile speed detection device and a control device, wherein, a piston rod of the left-turning hydraulic cylinder (8) and the bottom end of the cylinder block of the left-turning hydraulic cylinder are hinged with the active steering rear axle (9) and the first knuckle arm (17) respectively; a piston rod of the right-turning hydraulic cylinder (13) and the bottom end of the cylinder block of the right-turning hydraulic cylinder are hinged with the active steering rear axle (9) and the second knuckle arm (18) respectively; a first oil pressure output port (A) of the first control valve device (7) is communicated with a rodless cavity of the left-turning hydraulic cylinder (8) and a rod cavity of the right-turning hydraulic cylinder (13); a second oil pressure output port (B) of the first control valve device (7) is communicated with a rod cavity of the left-turning hydraulic cylinder (8) and a rodless cavity of the right-turning hydraulic cylinder (13); the middle-position locking hydraulic cylinder (10) comprises a middle-position locating block (28) fixedly arranged in a cylinder block (21) and a first piston (22) and a second piston (29) arranged on both sides of the middle-position locating block (28) respectively, wherein, the first piston (22) is fixedly connected with a piston rod, the inner cavity of the cylinder block (21) is separated into a rod cavity (25), a middle cavity (24) and a rodless cavity (26) by the first piston (22) and the second piston (29), the piston rod (23) of the middle-position locking hydraulic cylinder (10) and the bottom end of the cylinder block (21) are hinged with the active steering rear axle (9) and one of the first knuckle arm (17) and the second knuckle arm (18) respectively; a third oil pressure output port (T2) of the second control valve device (12) is communicated with the middle cavity (24), and a fourth oil pressure output port (D) is communicated with the rodless cavity (25) and the rod cavity (26) of the middle-position locking hydraulic cylinder (10), the third oil pressure output port (T2) is always communicated with the oil return circuit, in the case where the multi-axle automobile crane travels forward, the fourth oil pressure output port (D) outputs a high pressure and the third oil pressure output port (T2) is communicated with the oil return circuit; in the case where the multi-axle automobile crane turns, both the third oil pressure output port (T2) and the fourth oil pressure output port (D) are communicated with the oil return circuit; wherein, in the case where the lowest speed limit value of an automobile is detected by the automobile speed detection device, the front axle steering detection device detects that the front axle is located at a middle position, and the rear axle steering detection device detects that the active steering rear axle (9) is located at the middle position, the control device controls the middle-position locking hydraulic cylinder to be in an unlocked state.

2. The system of claim 1, characterized in that in the case where the first oil pressure output port (A) outputs a high pressure and the second oil pressure output port (B) is communicated with the oil return circuit, the piston rod of the left-turning hydraulic cylinder (8) extends and the piston rod of the right-turning hydraulic cylinder (13) retracts, so that the first knuckle arm (17) and the second knuckle arm (18) are driven to turn the rear left steering wheel (11) and the rear right steering wheel (15) left; and in the case where the first oil pressure output port (A) is communicated with the oil return circuit and the second oil pressure output port (B) outputs a high pressure, the piston rod of the left-turning hydraulic cylinder (8) retracts and the piston rod of the right-turning hydraulic cylinder (13) extends, so that the first knuckle arm (17) and the second knuckle arm (18) are driven to turn the rear left steering wheel (11) and the rear right steering wheel (15) right.

3. The system of claim 2, characterized in that in the case where the multi-axle automobile crane travels forward, both the second oil pressure output port (B) and the output oil pressure of the first oil pressure output port (A) are communicated with the oil return circuit.

4. The system of claim 2, characterized in that the bottom end of the cylinder block of the left-turning hydraulic cylinder (8) is hinged with the active steering rear axle (9), and the piston rod of the left-turning hydraulic cylinder (8) is hinged with the first knuckle arm (17); and the bottom end of the cylinder block of the right-turning hydraulic cylinder (13) is hinged with the active steering rear axle (9), and the piston rod of the right-turning hydraulic cylinder (13) is connected with the second knuckle arm (18).

5. The system of claim 2, characterized in that further comprising a pressure detection device (16) for detecting the oil pressure of the fourth oil pressure output port (D).

6. A multi-axle automobile crane comprising:
an active steering rear axle (9),
a rear left steering wheel (11) and a rear right steering wheel (15) mounted on the active steering rear axle (9),
a first knuckle arm (17) for controlling the steering of the rear left steering wheel (11),
a second knuckle arm (18) for controlling the steering of the rear right steering wheel (15),
an oil return circuit, and
a follow-up steering control system comprising:
a left-turning hydraulic cylinder (8), a right-turning hydraulic cylinder (13), a first control valve device (7), a middle-position locking hydraulic cylinder (10), a second control valve device (12), a front axle steering detection device, a rear axle steering detection device, an automobile speed detection device and a control device, wherein, a piston rod of the left-turning hydraulic cylinder (8) and the bottom end of the cylinder block of the left-turning hydraulic cylinder are hinged with the active steering rear axle (9) and the first knuckle arm (17) respectively; a piston rod of the right-turning hydraulic cylinder (13) and the bottom end of the cylinder block of the right-turning hydraulic cylinder are hinged with the active steering rear axle (9) and the second knuckle arm (18) respectively; a first oil pressure output port (A) of the first control valve device (7) is communicated with a rodless cavity of the left-turning hydraulic cylinder (8) and a rod cavity of the right-turning hydraulic cylinder (13); a second oil pressure output port (B) of the first control valve device (7) is communicated with a rod cavity of the left-turning hydraulic cylinder (8) and a rodless cavity of the right-turning hydraulic cylinder (13); the middle-position locking hydraulic cylinder (10) comprises a middle-position locating block (28) fixedly arranged in a cylinder block (21) and a first piston (22) and a second piston (29) arranged on both sides of the middle-position locating block (28) respectively, wherein, the first piston (22) is fixedly connected with a piston rod, the inner cavity of the cylinder block (21) is separated into a rod cavity (25), a middle cavity (24) and a rodless cavity (26) by the first piston (22) and the second piston (29), the piston rod (23) of the middle-position locking hydraulic cylinder (10) and the bottom end of the cylinder block (21) are hinged with the active steering rear axle (9) and one of the first knuckle arm (17) and the second knuckle arm (18) respectively; a third oil pressure output port (T2) of the second control valve device (12) is communicated with the middle cavity (24), and a fourth oil pressure output port (D) is communicated with the rodless cavity (25) and the rod cavity (26) of the middle-position locking hydraulic cylinder (10), the third oil pressure output port (T2) is always communicated with the oil return circuit, in the case where the multi-axle automobile crane travels forward, the fourth oil pressure output port (D) outputs a high pressure and the third oil pressure output port (T2) is communicated with the oil return circuit; in the case where the multi-axle automobile crane turns, both the third oil pressure output port (T2) and the fourth oil pressure output port (D) are communicated with the oil return circuit; wherein, in the case where the lowest speed limit value of an automobile is detected by the automobile speed detection device, the front axle steering detection device detects that the front axle is located at a middle position, and the rear axle steering detection device detects that the active steering rear axle (9) is located at the middle position, the control device controls the middle-position locking hydraulic cylinder to be in an unlocked state.

7. The system of claim 6, characterized in that in the case where the first oil pressure output port (A) outputs a high pressure and the second oil pressure output port (B) is communicated with the oil return circuit, the piston rod of the left-turning hydraulic cylinder (8) extends and the piston rod of the right-turning hydraulic cylinder (13) retracts, so that the first knuckle arm (17) and the second knuckle arm (18) are driven to turn the rear left steering wheel (11) and the rear right steering wheel (15) left; and in the case where the first oil pressure output port (A) is communicated with the oil return circuit and the second oil pressure output port (B) outputs a high pressure, the piston rod of the left-turning hydraulic cylinder (8) retracts and the piston rod of the right-turning hydraulic cylinder (13) extends, so that the first knuckle arm (17) and the second knuckle arm (18) are driven to turn the rear left steering wheel (11) and the rear right steering wheel (15) right.

8. The system of claim 7, characterized in that in the case where the multi-axle automobile crane travels forward, both the second oil pressure output port (B) and the output oil pressure of the first oil pressure output port (A) are communicated with the oil return circuit.

9. The system of claim 7, characterized in that the bottom end of the cylinder block of the left-turning hydraulic cylinder (8) is hinged with the active steering rear axle (9), and the piston rod of the left-turning hydraulic cylinder (8) is hinged with the first knuckle arm (17); and the bottom end of the cylinder block of the right-turning hydraulic cylinder (13) is hinged with the active steering rear axle (9), and the piston rod of the right-turning hydraulic cylinder (13) is connected with the second knuckle arm (18).

10. The system of claim 7, characterized in that further comprising a pressure detection device (16) for detecting the oil pressure of the fourth oil pressure output port (D).

* * * * *